June 28, 1927.

S. H. MORTIMER 1,634,202

ROLLER CLUTCH

Filed Jan. 7, 1926

Inventor—
Stockton H. Mortimer
by his Attorneys—
Howson & Howson

June 28, 1927.

S. H. MORTIMER 1,634,202

ROLLER CLUTCH

Filed Jan. 7, 1926

Inventor -
Stockton H. Mortimer,
by his Attorneys.
Howson & Howson

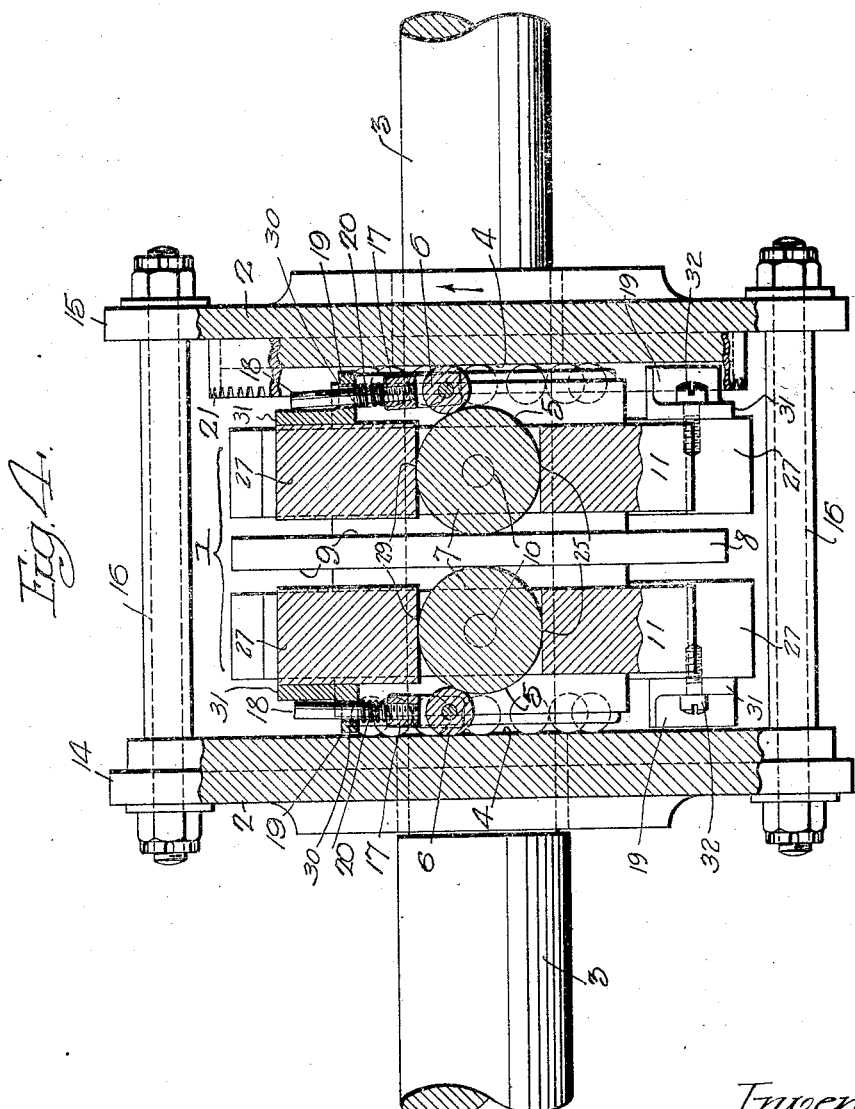

Patented June 28, 1927.

1,634,202

UNITED STATES PATENT OFFICE.

STOCKTON H. MORTIMER, OF PHILADELPHIA, PENNSYLVANIA.

ROLLER CLUTCH.

Application filed January 7, 1926. Serial No. 79,853.

The invention relates to a roller clutch of the type which acts automatically to transfer power from one rotary member to another when the driving member rotates in one direction and which serves to automatically disengage itself when the driving member rotates relatively in the opposite direction. A clutch of this type ordinarily includes one or more rollers carried by one of the members and adapted to be wedged between an inclined friction surface on the said member and another friction surface on the other member. Considerable difficulty has heretofore been experienced by reason of the fact that each roller always engages the same place on the inclined friction surface upon successive engagements of the clutch, with the result that eventually a groove is worn or pressed into the said friction surface. The existence of this groove interferes with the free engagement and disengagement of the clutch and, when deep enough, causes the clutch to be inoperative.

The principal object of the present invention is to provide a friction clutch so constructed that the rollers thereof will engage the friction surfaces at different places upon successive engagements, thus avoiding the forming of grooves as heretofore stated.

Further objects of the invention are to provide certain improved structural features wherein the main object of the invention is made possible.

In the accompanying drawings I have shown one embodiment of the invention, but it will be understood that the drawings are for illustrative purposes only and are not to be construed as defining or limiting the scope of the invention, the claims forming a part of this specification being relied upon for that purpose.

Of the drawings:

Fig. 4 is a fragmentary longitudinal sectional view taken along the line 4—4 of Fig. 2.

Figure 1:
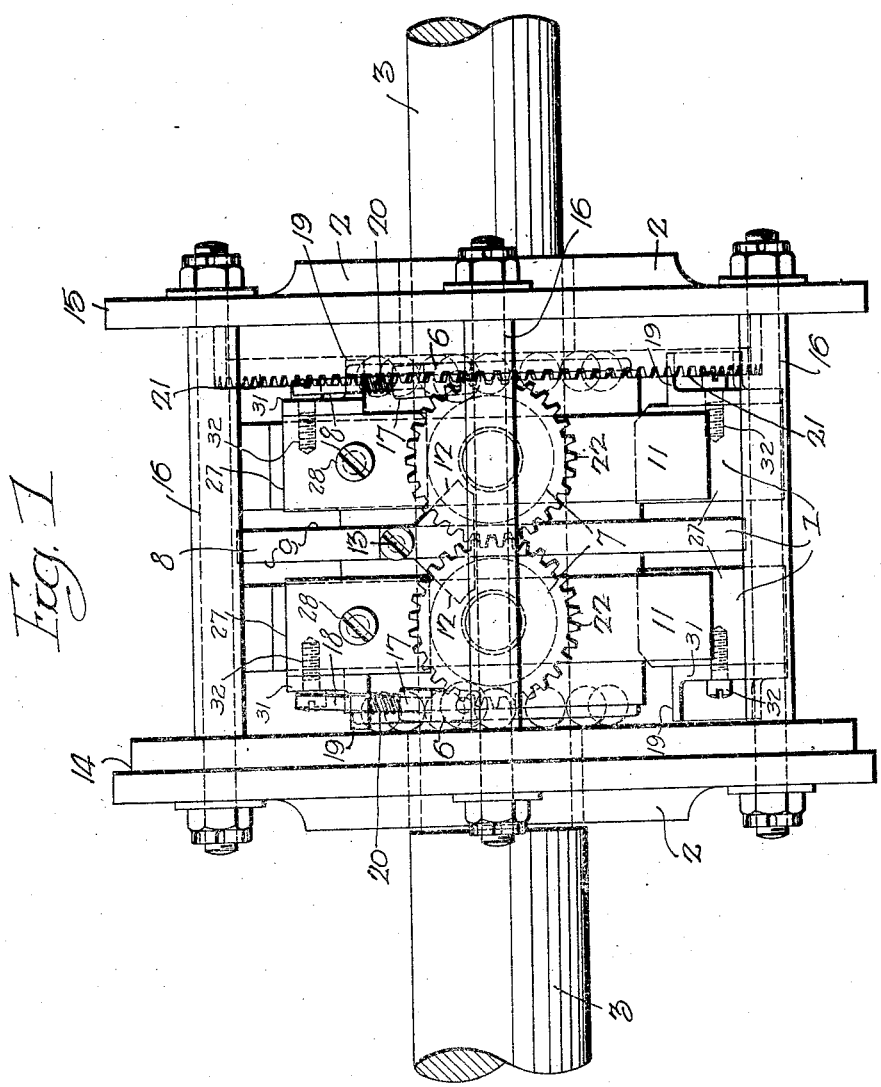
Figure 1 is a side view of a clutch embodying the invention.
Figure 2:
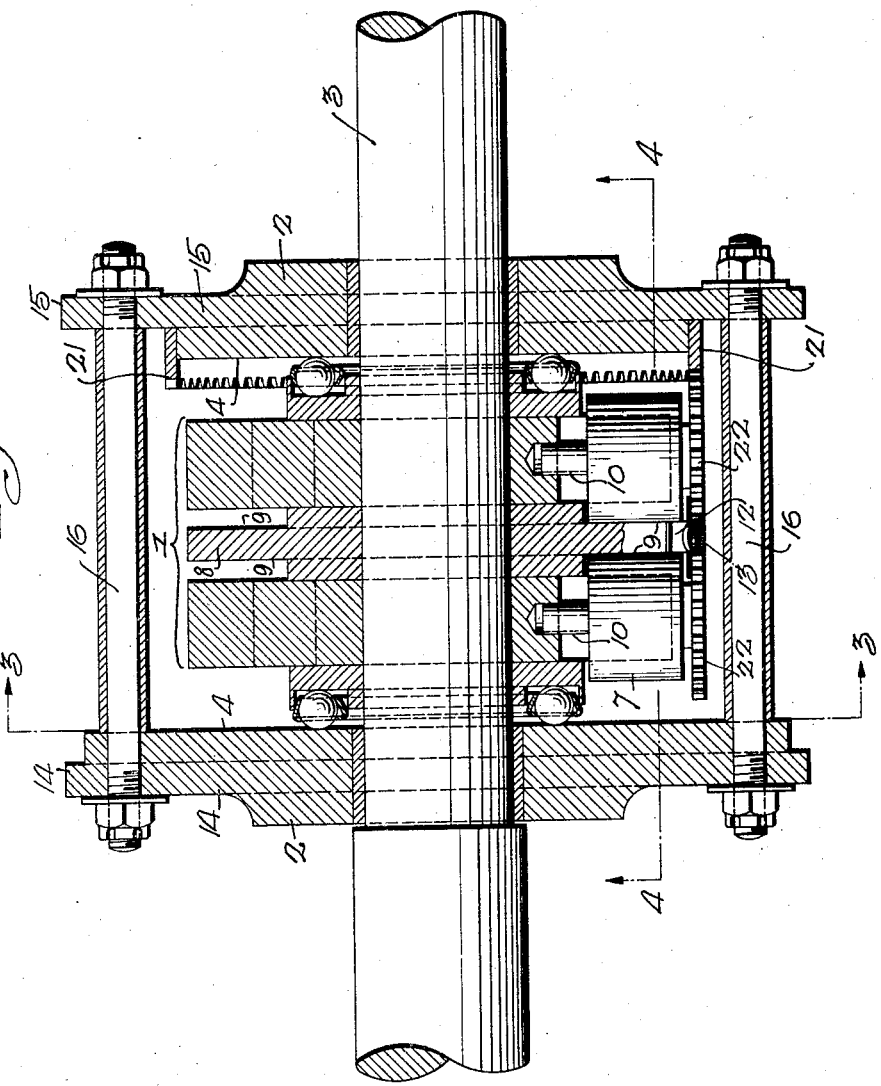
Fig. 2 is a central longitudinal sectional view.

Referring to the drawings, 1 and 2 respectively represent two members adapted to rotate about a common axis, one of the members being adapted to serve as a driving member and the other being adapted to be driven from the driving member. As illustrated, 1 is the driving member, being rigidly secured to a drive shaft 3, and 2 is the driven member, being rotatably mounted on the shaft 3.

One of the members is provided with at least one continuous friction surface 4 in the form of a surface of revolution. While I do not so limit myself, I prefer and have shown the continuous friction surface as being on the driven member 2, and this friction surface is shown as being flat and located in a plane perpendicular to the axis of rotation. Preferably there are two similar friction surfaces 4, 4 on the driven member, these being located in opposed relation.

The other member, and in this case the driving member 1, is provided with at least one friction surface 5 corresponding to each of the friction surfaces 4 on the driven member, these friction surfaces being inclined with respect to the corresponding friction surfaces 4. The inclination between the friction surfaces 4 and 5 permits rollers 6 to become wedged therebetween and to thus serve as driving means for transmitting power from the driving member to the driven member. In order that the rollers 6 may not always engage the inclined friction surfaces 5 at the same places, provision is made for varying the relative positions of the opposed friction surfaces 4 and 5. The desired result may be accomplished in various ways, but I prefer to accomplish it by means of the construction which will now be described in detail.

Preferably the several friction surfaces 5, instead of being formed directly on the driving member 1, are formed on supplemental devices which are carried by the said member and which are movable relatively thereto. These relatively movable devices may vary in form, but I prefer and have shown cylinders 7, 7 arranged with their axes extending radially or approximately so. The peripheral surfaces of these cylinders constitute the aforesaid friction surfaces 5, 5. It will be seen that the cylinders can be turned between successive engagements of the clutch, thus causing the rollers 6, 6 to engage different parts of the surfaces 5, 5 upon successive engagements.

Figure 3:
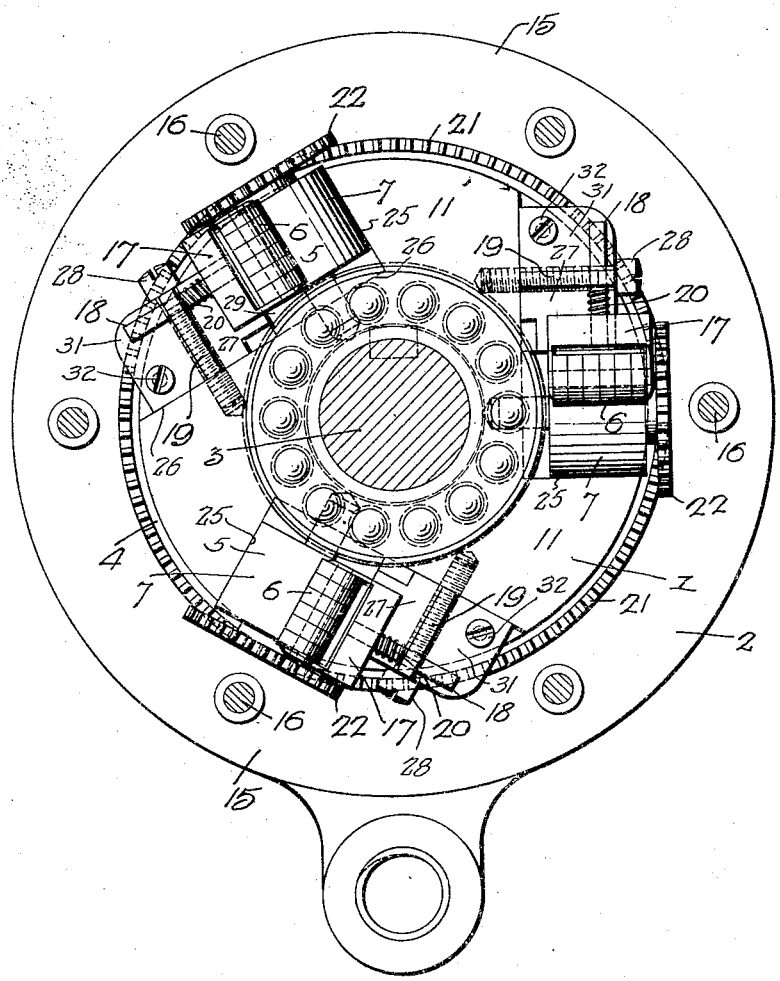
Fig. 3 is a transverse sectional view taken along the line 3—3 of Fig. 2.

When there are two opposed friction surfaces 4, 4 on the driven member and two sets of rollers 6, 6, cooperating with them, the cylinders 7, 7 are arranged in pairs to be engaged by the respective rollers. The several pairs of cylinders 7, 7 are preferably uniformly spaced circumferentially. An annular flange 8 is provided on the driving member, this flange having opposite bearing surfaces 9, 9 with which the respective cylinders 7, 7 of the several pairs engage. As shown, the cylinders 7, 7 are provided at their inner ends with trunnions 10, 10 which project into apertures in the main body of the driving member 1. Preferably the main body of the driving member is provided with lugs 11 which project outward as shown in Fig. 3 and which have bearing surfaces 25 contacting with the surfaces 5 of the respective cylinders 7, 7. Perpendicular to the bearing surface 25 of each lug 11 a flat surface 26 is formed in the driving member 1. A bearing block 27 is secured to each of the surfaces 26 by a screw 28, and has a surface 29 which bears against the side of the cylinder 7 opposite to that engaged by the surface 25 of the lug 11. Thus each cylinder 7 is rotatably and radially supported in the driving member 1 by the cooperation of the bearing surfaces 9, 25 and 29 of the flange 8, lug 11 and the bearing block 27 respectively. The cylinders of each pair are held against radial movement outward by means of a clip 12 held in place by a screw 13.

As shown, the two surfaces 4, 4 of the driven member are formed on two separate disks 14 and 15 which are held in fixed relation to each other by means of tie bolts 16. Associated with each cylinder 7 and adapted to cooperate with it and with the corresponding bearing surface 4 is one of the beforementioned rollers 6. Provision is made for automatically holding each roller 6 in the bite between the surface 5 of the corresponding cylinder 7 and the corresponding friction surface 4, it being understood that the rollers are slightly greater in diameter than the minimum distance between the surfaces 4 and 5. As shown, each roller 6 is rotatably mounted in a yoke 17 which is provided with a guide pin 18. The guide pin 18 projects through an aperture 30 in a lug 19 which is formed on one end of a plate 31. The plate 31 is secured to the bearing block 27, on the driving member 1, by a screw 32. A spring 20 surrounds the guide pin 18, between the lug 19 and the yoke 17, and serves to press the roller 6 into the bite between the cylinder 7 and the adjacent friction surface 4 of the driven member 2.

From the foregoing description it will be seen that when the driving member is rotated in the direction shown in Fig. 4 each cylinder 7 is firmly supported and held by the bearing surfaces on the flange 8 and on the corresponding lug 11. Each roller 6 is held by the corresponding spring 20 in the bite between the corresponding cylinder 7 and the adjacent friction surface 4, with the result that the driving force of the driving member serves to more tightly wedge the rollers and thus transmit power through the rollers to the driven member. Inasmuch as the cylinders 7, the rollers 6 and the friction surfaces 4 are arranged in pairs, it will be seen that the longitudinal forces are equalized and balanced, with the result that only rotary movement is transmitted to the driven member without any tendency to cause longitudinal movement between the driving and driven members.

Inasmuch as the cylinders 7 are rotatable, it will be seen that any rotative movement of these cylinders will bring different portions of the surfaces 5 thereof into position to be engaged by the rollers 6. By moving the cylinders from time to time, the formation of undesirable grooves therein can be avoided.

Preferably I provide means for automatically moving the cylinders 7 between each two engagements of the clutch. When the clutch is engaged and the driving and driven members are rotated together, there is no rotative movement of the cylinders, but I provide means whereby rotative movement is automatically caused whenever there is relative reverse rotation of the driving member with respect to the driven member. As shown, an annular gear 21 is mounted on the driven member at one side thereof, and each of the cylinders 7 is provided with a gear 22 rigidly connected thereto. The gears 22 of each pair of cylinders mesh with each other, and one of them meshes with the said annular gear 21. The result is that when the motion of the driving member is reversed, the annular gear 21 causes the gears 22 to rotate, and thus causes the cylinders 7 to rotate about their axes. This rotation of the cylinders will continue so long as the driving member is rotated, and the result is that after the reverse movement of the driving member has stopped, the cylinders will have been left in the different positions, so that upon the next engagement of the clutch the rollers 6 will engage different parts of the surfaces 5 thereof.

Throughout this specification I have referred to a roller clutch and to rollers forming parts thereof. It is to be understood, however, that as concerns the broader aspects of the invention I do not limit myself to cylindrical rollers, but may substitute other bodies capable of rolling, such as balls or cones.

What I claim is:

1. In a roller clutch, the combination of rotary driving and driven members, one of which has a continuous friction surface in the form of a surface of revolution, a device carried by and rotatable with respect to the other member and provided with a friction surface converging toward the first said friction surface, a roller interposed between the members and adapted to engage both friction surfaces to transmit power in one direction from the driving member to the driven member, a gear on the first said member, and a meshing gear connected with the said rotatable device for turning the latter when the driving member is turned in the reverse direction.

2. In a roller clutch, the combination of rotary driving and driven members, one of which has a flat friction surface perpendicular to the axis of rotation, a radial cylinder carried by and rotatable with respect to the other member and provided with a friction surface thereon, and a roller interposed between the members and adapted to engage both friction surfaces to transmit power in one direction from the driving member to the driven member.

3. In a roller clutch, the combination of rotary driving and driven members, one of which has a flat friction surface perpendicular to the axis of rotation, a radial cylinder carried by and rotatable with respect to the other member and provided with a friction surface thereon, a roller interposed between the members and adapted to engage both friction surfaces to transmit power in one direction from the driving member to the driven member, a gear on the member which is provided with the flat friction surface, and a meshing gear connected with the cylinder for turning it when the driving member is turned in the reverse direction.

4. In a roller clutch, the combination of rotary driving and driven members, one of which has two opposed similar continuous friction surfaces in the forms of surfaces of revolution, a pair of devices carried by and rotatable with respect to the other member and provided with opposed similar friction surfaces respectively converging toward the first said friction surfaces, a pair of rollers interposed between the members and each adapted to engage one of the continuous friction surfaces and the companion friction surface on one of the rotatable devices to transmit power in one direction from the driving member to the driven member, and means for automatically turning the said rotatable devices including a gear on the first said member and other gears connected with the said rotatable devices.

5. In a roller clutch, the combination of rotary driving and driven members, one of which has two opposed similar flat friction surfaces perpendicular to the axis of rotation, a pair of radial cylinders carried by and rotatable with respect to the other member and provided with friction surfaces thereon, and a pair of rollers interposed between the members and each adapted to engage one of the flat friction surfaces and the companion friction surface on one of the cylinders to transmit power in one direction from the driving member to the driven member.

6. In a roller clutch, the combination of rotary driving and driven members, one of which has two opposed similar flat friction surfaces perpendicular to the axis of rotation, a pair of radial cylinders carried by and rotatable with respect to the other member and provided with friction surfaces thereon, means on the last said member for engaging the surfaces of the cylinders to rigidly support the latter, and a pair of rollers interposed between the members and each adapted to engage one of the flat friction surfaces and the companion friction surface on one of the cylinders to transmit power in one direction from the driving member to the driven member.

7. In a roller clutch, the combination of rotary driving and driven members, one of which has two opposed similar flat friction surfaces perpendicular to the axis of rotation, a pair of radial cylinders carried by and rotatable with respect to the other member and provided with friction surfaces thereon, a pair of rollers interposed between the members and each adapted to engage one of the flat friction surfaces and the companion friction surface on one of the cylinders to transmit power in one direction from the driving member to the driven member, and means for automatically turning the said cylinders between successive engagements of the clutch.

8. In a roller clutch, the combination of rotary driving and driven members, one of which has two opposed similar flat friction surfaces perpendicular to the axis of rotation, a pair of radial cylinders carried by and rotatable with respect to the other member and provided with friction surfaces thereon, a pair of rollers interposed between the members and each adapted to engage one of the flat friction surfaces and the companion friction surface on one of the cylinders to transmit power in one direction from the driving member to the driven member, and means for automatically turning the said cylinders including a gear on the first said member and other gears connected with the said cylinders.

STOCKTON H. MORTIMER.